United States Patent Office 2,726,132
Patented Dec. 6, 1955

2,726,132

TREATMENT OF ACRYLONITRILE POLYMERS WITH AROMATIC SULFONIC ACID HALF SALTS

Alfred B. Craig, Decatur, Ala., assignor to The Chemstrand Corporation, Decatur, Ala., a corporation of Delaware No Drawing. Application April 20, 1953,
Serial No. 349,951

12 Claims. (Cl. 8—17)

This invention relates to new dye-receptive polymers and fibers prepared therefrom. More specifically, the invention relates to methods of converting polymers and fibers of non-dye-receptive polymers into polymers of more general purpose utility.

It is well-known that polyacrylonitrile and copolymers of 80 percent or more of acrylonitrile and up to 20 percent of other monomeric substances have excellent fiber-forming properties. In general, the polymers of the prior art are not dye-receptive unless a substantial portion of a chemically reactive comonomer is present in polymeric form in the acrylonitrile polymer. Usually such chemically reactive comonomers induce a reduction in the optimum physical properties of the fibers prepared from such polymers.

This invention has for an object the provision of a method for increasing the dye-receptivity and the moisture absorption of acrylonitrile polymers, which does not involve any sensible sacrifice in properties of the fibers or in their utility in textile applications. A further object of this invention is to provide fibers of novel composition which are fully dye-receptive to acid type dyestuffs and have increased moisture absorption properties. Other objects will appear hereinafter.

In accordance with the invention described herein, the dye-receptivity of acrylonitrile polymers is improved by treatment of the polymers in the form of a solid with the half salt of an aromatic sulfonic acid and a compound having the structure:

wherein R represents hydrogen or an alkyl radical having from 1 to 4 carbon atoms, inclusive, X represents —NH₂ or —OH, and n represents one of the integers 2 and 3. As representative examples of compounds falling within the scope of the structural formula may be mentioned ethylene diamine, 2-aminoethanol, 2-amino-3-propanol, propanediamine, etc.

The half acid salts which are used in accordance with this invention are prepared by dissolving an aromatic sulfonic acid in the desired diamino or aminohydroxy compound or by dissolving both the acid and diamino or aminohydroxy compound in a common solvent. Satisfactory yields of the salt are obtained with from 0.1 mole to 2 moles of acid per mole of amino compound depending upon the particular amino compound used. In some instances an excess of amino compound is employed to act as a solvent for the salt. The salts useful in the process of this invention are those having the formula

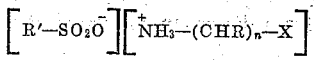

wherein X, R, and n have the values defined above for the diamino and aminohydroxy compounds, and R′ represents an aryl or alkylaryl radical.

The exact chemical nature of the reaction which takes place when acrylonitrile polymers are treated with these half acid salts is not fully understood. It is believed, however, that the increased dye-receptivity results from the formation and introduction of reactive imidazoline or oxazoline groups into the polymer chains.

The treatment is effected by contacting the polymer at a temperature of from 100° C. to 200° C. with at least 2% by weight of the half acid salt. The treatment is continued until the dye-receptivity of the polymer is substantially increased. The optimum time will depend upon the concentration of the salt solution and upon the particular temperature selected which may be as little as a few seconds at 200° C. and as long as several hours at 100° C. The process is most advantageously conducted, and the most satisfactory modifications of the properties of the polymer obtained, when the treatment is carried out at temperatures of from 125° C. to 170° C. for periods of time ranging from 5 to 15 minutes.

Suitable polymers for the practice of this invention are polyacrylonitrile and copolymers of at least 80 percent of acrylonitrile and up to 20 percent of an olefinic monomer copolymerizable therewith, for example, vinyl acetate, or other vinyl ester of a monocarboxylic acid; styrene, or other vinyl substituted aromatic hydrocarbon; alpha-methylstyrene, or other isopropenyl substituted aromatic hydrocarbon; vinyl chloride, or other vinyl halide; methyl methacrylate, or other alkyl ester of methacrylic acid; methyl acrylate, or other alkyl ester of acrylic acid; dimethyl fumarate, or other dialkyl ester of fumaric acid; dimethyl maleate, or other dialkyl ester of maleic acid; vinylidene chloride; methacrylonitrile; the vinylpyridines; the various alkyl substituted vinylpyridines; and the corresponding vinyl, isopropenyl, allyl and methallyl substituted pyridines, quinolines, imidazoles, pyrazines, oxazoles, imidazolines, pyrimidines, benzimidazoles, benzoxazoles, benzothiazoles, pyridazines, pyrazoles, pyrroles, triazines and other compounds containing N-heterocyclic ring structures.

The preparation of the new dye-receptive polymers is conducted by subjecting the nitrile groups of the polymer to the action of the herein disclosed half acid salts. To render the polymer sufficiently dye-receptive, it is usually necessary to react from 1 to 20 percent of the nitrile groups and by the reaction to convert them into the functional imidazoline radicals. To effect the desired result a substantial excess of the salt should preferably be used. In this manner, the likelihood of reaction of a sufficient number of nitrile groups is increased.

The invention is further illustrated by the following examples.

*Example I*

The half acid salt of ethylenediamine was prepared by adding 120 g. of benzene sulfonic acid to 90 g. of ethylenediamine. This salt was used to treat fibers in the following experiments.

*Example II*

A skein of fiber, prepared from a copolymer of 97 percent acrylonitrile and 3 percent vinyl acetate, was immersed in the salt prepared in Example I for 90 minutes at 100° C. A deep red shade was developed when the treated skein was washed and then dyed with Wool Fast Scarlet G Supra.

*Example III*

A skein of fiber, prepared from a copolymer of 97 percent acrylonitrile and 3 percent vinyl acetate, was treated as in Example II for 10 minutes at 145° C. The modified fibers dyed to a deep red with Wool Fast Scarlet, and completely exhausted the dyebath.

*Example IV*

A skein of fiber, prepared from a copolymer of 97 percent acrylonitrile and 3 percent vinyl acetate, was treated as in Example II for 10 minutes at 155° C. The modified fibers exhausted a Wool Fast Scarlet dyebath in one minute at room temperature.

*Example V*

A series of polyacrylonitrile fiber skeins was treated as in Example II under the following conditions and with the following results when dyed with Wool Fast Scarlet.

| Conditions of Treatment | | Results |
|---|---|---|
| Time | Temperature, °C. | Dyeability |
| None (Control) | | Very Poor. |
| 2 min | 155 | Poor. |
| 5 min | 155 | Good. |
| 10 min | 155 | Excellent. |
| 10 min | 135 | Do. |
| 10 min | 120 | Fair. |
| 30 min | 120 | Good. |

Example VI

One gram of benzene sulfonic acid was dissolved in 50 g. of ethylenediamine. A skein of polyacrylonitrile fiber was added to the resulting salt and the solution refluxed at 170° C. for 30 minutes. The skein was then washed and dyed readily with Wool Fast Scarlet.

Example VII

Seventy grams of benzene sulfonic acid was dissolved in 24 g. of ethylenediamine. A skein of polyacrylonitrile fiber was treated in the resulting salt for 10 minutes at 155° C. The washed fibers dyed readily to a deep red shade with Wool Fast Scarlet.

Example VIII

Forty grams of benzene sulfonic acid was dissolved in 30 g. of 2-aminoethanol and heated to 155° C. A skein of polyacrylonitrile fiber was treated with the resulting salt for 10 minutes at that temperature and then washed. The treated skein dyed readily with Wool Fast Scarlet.

The examples illustrate improved dye-receptivity with a specific acid dyestuff. Similar improved affinity is obtained toward other acid dyestuffs, e. g., neutral dyeing colors, sour dyeing colors, anthraquinone dyes, and premetalized azo dyes.

While the process of this invention has been illustrated with reference to treatment of fibers, it is also applicable to the treatment of other solid forms of acrylonitrile polymers. It is necessary that the polymer to be treated be in solid form, however, as the process is not applicable to the treatment of solutions of polymers.

The process of this invention is simple and economical and through its use the markedly improved dye-receptivity of acrylonitrile fibers is obtained without sacrifice in essential fiber properties, such as elongation and tensile strength. Fibers composed of acrylonitrile polymers treated in accordance with the process described herein can be dyed directly with acid dyestuffs. In addition, fibers so treated show a great increase in moisture absorption properties.

It will be understood to those skilled in the art that many apparently widely different embodiments of this invention can be made without departing from the scope and spirit thereof. Accordingly, it is to be understood that this invention is not limited to the specific embodiments thereof except as defined in the appended claims.

I claim:

1. A process which comprises contacting a solid polymer of at least 80 percent acrylonitrile with at least 2 percent, based on the weight of said polymer, of a compound having the formula:

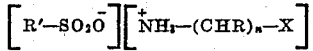

wherein X represents one of the group consisting of —NH$_2$ and —OH, R represents one of the group consisting of hydrogen and alkyl radicals having from 1 to 4 carbon atoms, inclusive, R' represents a radical selected from the group consisting of aryl and alkylaryl radicals, and $n$ represents one of the integers 2 and 3, at a temperature of from 100° C. to 200° C. until the dye-receptivity of the said polymer is substantially increased.

2. A process which comprises contacting a polymer of at least 80 percent acrylonitrile in the form of a filament, with at least 2 percent, based on the weight of said polymer, of a compound having the formula:

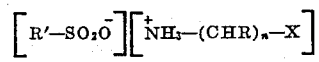

wherein X represents one of the group consisting of —NH$_2$ and —OH, R represents one of the group consisting of hydrogen and alkyl radicals having from 1 to 4 carbon atoms, inclusive, R' represents a radical selected from the group consisting of aryl and alkylaryl radicals, and $n$ represents one of the integers 2 and 3, at a temperature of from 100° C. to 200° C. until the dye-receptivity of the said polymer is substantially increased.

3. The process set forth in claim 1 in which the compound is the half salt of an aromatic sulfonic acid and 2-amino-3-propanol.

4. The process set forth in claim 1 in which the compound is the half salt of an aromatic sulfonic acid and ethylenediamine.

5. The process set forth in claim 1 in which the compound is the half salt of an aromatic sulfonic acid and 2-aminoethanol.

6. The process set forth in claim 1 in which the compound is the half salt of aromatic sulfonic acid and propanediamine.

7. A process for dyeing solid polymers of at least 80 percent acrylonitrile which comprises subjecting said polymer to the action of at least 2 percent based on the weight of said polymer, of a compound having the formula:

wherein X represents one of the group consisting of —NH$_2$ and —OH, R represents one of the group consisting of hydrogen and alkyl radicals having from 1 to 4 carbon atoms, inclusive, R' represents a radical selected from the group consisting of aryl and alkylaryl radicals, and $n$ represents one of the integers 2 and 3 at a temperature of from 100° C. to 200° C. until the dye-receptivity of the polymer is substantially increased, and subsequently dyeing the polymer with an acid dyestuff.

8. The process of claim 7 in which the polymer is in the form of a filament.

9. The process of claim 7 in which the compound is added to the dye bath.

10. A dye-receptive acrylonitrile polymer which is the reaction product obtained by reacting polymeric acrylonitrile with a compound having the formula:

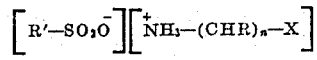

wherein X represents a member of the group consisting of —NH$_2$ and —OH, R represents a member of the group consisting of hydrogen and alkyl radicals having from 1 to 4 carbon atoms, inclusive, R' represents a radical selected from the group consisting of aryl and alkylaryl radicals, and $n$ represents an integer from 2 to 3, inclusive, at a temperature of from 100° C. to 200° C. until the dye-receptivity of the polymeric acrylonitrile is substantially increased.

11. The composition of claim 10 wherein the compound is the half salt of an aromatic sulfonic acid and ethylenediamine.

12. The composition of claim 10 wherein the compound is the half salt of an aromatic sulfonic acid and 2-aminoethanol.

No references cited.